Nov. 19, 1929.  H. D. KELLY  1,736,265
LEACHER BUCKET FOR COFFEE URNS
Filed Feb. 2, 1929

Inventor
H. D. Kelly.
By Thorpe & Thorpe
Attorneys

Patented Nov. 19, 1929

1,736,265

UNITED STATES PATENT OFFICE

HENRY D. KELLY, OF KANSAS CITY, MISSOURI

LEACHER BUCKET FOR COFFEE URNS

Application filed February 2, 1929. Serial No. 337,031.

This invention relates to leacher buckets for coffee urns, and has for its primary object to produce a construction whereby a greater proportion of the ground coffee in the leacher bucket than heretofore, shall be available in the production of coffee beverage, and thereby insure that the quality of the beverage shall be enhanced and the urn operated more economically.

Heretofore, leacher buckets have been employed which, in the attempt to use all of the ground coffee therein, have had annular water chambers depending into the mass of ground coffee, for discharging boiling water into the latter, but with such constructions it has not been possible to extract the full strength of the ground coffee and hence impossible to operate the urn as economically as desirable. The constructions mentioned have also proved inefficient because the ground coffee did not remain equitably distributed in the bucket, as the force of the boiling water jetted into the mass of ground coffee, would pile the latter up in places to such degree that a large proportion of practically pure water would pass through the thin portions of the mass into the beverage jar, or when the bottom of the bucket was practically clean, directly into such jar. In either case, the beverage produced would be weak and of poor quality. Another reason assigned for the inequitable distribution of the ground coffee, is that the top of a large urn on a counter or table, approximates the height of the average waiter, who almost invariably tilts the leacher bucket to a sharp angle in raising it over and depositing it in the urn and thereby causes the ground coffee, which at such time is in a perfectly dry state, to flow or slide to the low side of the tilted bucket and either uncover part of the bottom or cover the high part thereof to a materially greater depth than the low part. As a result, upon turning on the boiling water, a good proportion of the latter enters the jar in a substantially pure state or as a very weak coffee beverage, it being clear that if either of the objectionable conditions mentioned obtains, the water seeking the course of least resistance, will charge the jar to the required depth before sufficient time has elapsed for the extraction of the full strength of the ground coffee by the minor flow of water coming into contact with the ground coffee.

Accordingly, I have provided a leacher bucket having a wheel-shaped ring to rest upon the perforated bottom, or on a paper filter placed upon the perforated bottom of the bucket, the hub portion of the ring having openings establishing communication between the interior of the hub and the spaces between the spokes, the latter also having openings to provide for the passage of boiling water circularly from one compartment formed by the spokes to another and from each and all of said compartments to the hub chamber and vice versa, the interior of the hub accommodating a depending water discharge nozzle, so that water may be discharged in practically every direction into different masses of ground coffee with which the hub and various compartments are provided. It will thus be seen that all of the ground coffee is subjected to action by the water, so that the full strength of the former may be extracted, and that the hub and spokes guard against the uncovering of any part of the filter in the event the leacher bucket is tilted preliminarily to its deposit in the urn.

With the objects mentioned in view the invention consists in certain novel and useful features of construction and combinations of parts as hereinafter described and claimed; and in order that it may be fully understood, reference is to be had to the accompanying drawing, in which:

Figure 1:
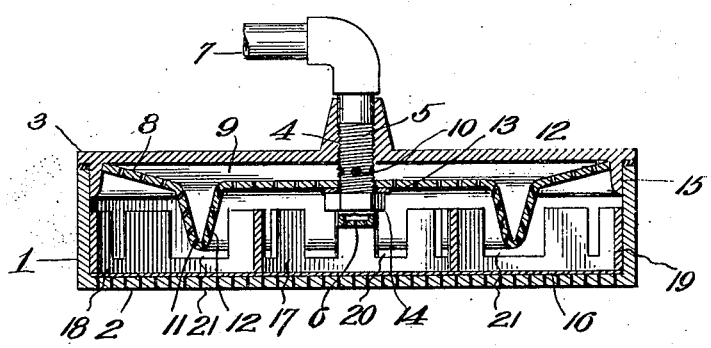
Figure 1 is a central vertical section of a leacher bucket embodying the invention.
Figure 2:
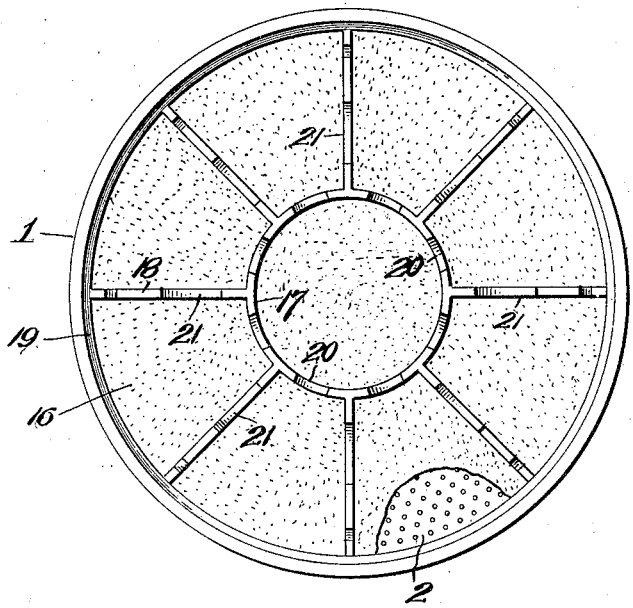
Figure 2 is a top plan view with the cover of the bucket omitted.

Referring to the drawing in detail, 1 indicates a leacher bucket of size suitable for holding enough ground coffee to fill the jar, not shown, of the coffee urn. The bucket is preferably of cylindrical form and has a foraminous bottom 2. The cover 3, of the bucket is adapted to fit thereon with a liquid-tight joint and to be clamped or otherwise rigidly secured in place as the leacher bucket is charged with a requisite quantity of ground coffee. The cover is provided with a central opening 4 wherein is secured a depending threaded tube 5 which preferably is provided with one or more jet orifices 6, and said tube in effect forms an extension of a pipeway 7 through which boiling water is forced into the leacher bucket.

For uniform distribution of the water in the form of jets, within the leacher bucket, a perforated plate 8 is secured marginally with a liquid-tight joint to the cover and is spaced except at its margin from the cover so as to provide a water chamber 9 for receiving water from the tube 5 through one or more discharge openings 10 in the latter, and said water-jet plate, forming the bottom of chamber 9, is provided with a hollow circular rib 11, preferably V-shaped in cross section. The said rib and the body of the plate are formed with jet orifices 12, so that water entering chamber 9 shall be jetted into the bucket over practically the entire area thereof and in different horizontal planes, the jet orifice or orifices 6 of the tube 5 cooperating in this action so that ground coffee in the center of the leacher bucket shall be as thoroughly exposed to the action of the boiling water as that which is jetted directly from the plate, it being noted that through the use of washer 13 and a clamping nut 14, the plate 8 can be efficiently and economically secured to and within the annular flange 15 depending from the cover to centralize it with respect to the bucket.

As thus far described, the construction is substantially the same as illustrated in other United States patents which I have secured, and standing alone is open to the objections hereinbefore mentioned, even where I have employed a paper filter as at 16 through which the beverage is forced from the bucket into the underlying beverage jar.

The objections stated, briefly, are that the water jetting into the mass of ground coffee tends to pile the same up to a greater extent in some places than others, and tilting of the leacher bucket displaces the ground coffee. In both cases, as stated, the beverage produced is weak and, the full strength of the coffee not being employed, there is a lack of economy in the operation.

To overcome these objections I have provided what may be generally described as a wheel ring comprising a hub 17, spokes 18 and a rim 19. This wheel ring will preferably exceed in depth the charge of coffee to be placed in the leacher bucket so that such charge shall be subdivided and practically all that is initially deposited in the separate hub and spoke chambers, remain in such chambers during the coffee making operation regardless of the action of the jets of boiling water and regardless of whether the level of the bucket is maintained in placing it in position on the urn. It is desirable however that the water discharged into any compartment may circulate throughout any or all of the compartments, and for this reason the hub and the spokes are respectively provided with notches or passages 20 and 21. Certain of the notches or openings 21 of the spokes are of substantial size so that the V-shaped portion of the jet plate may depend to a plane approximating that of the bottom of the notches or openings in order that water discharged from the lower end of the annular portion 11 of plate 8, may penetrate the mass of ground coffee almost to the level of the filter sheet. The disturbance of the ground coffee will be localized largely within the respective chambers by the water and of course some of the ground coffee may circulate through some of the notches or openings. As a result of this arrangement it has been found that from a given quantity of ground coffee practically the full strength can be extracted in a very short period, thereby eliminating loss of coffee as well as of time and producing a beverage rich in quality.

After each coffee making operation the leacher bucket will be removed and after the cap is taken off, the contents of the bucket will be dumped out. A new filter sheet will be placed in position and the wheel partition placed thereon. The bucket is then ready to be recharged with coffee for the next beverage producing operation.

From the above description, it will be apparent that I have produced a leacher bucket for coffee urns which embodies the features of advantage set forth in the statement of the objects of the invention, and which is susceptible of modification in certain particulars within the spirit and scope of the appended claims.

I claim:

1. A leacher bucket having a foraminous bottom and a cover, means for supplying boiling water to the bucket, and means projecting upward from the bottom of the bucket and providing the latter with a plurality of chambers for holding ground coffee and maintaining it at a substantially uniform depth over the entire surface of the bottom of the bucket.

2. A leacher bucket having a removable partition resting within and on the bottom of the bucket and dividing the lower part of the bucket into a plurality of compartments, the partition having notches in its upper edge establishing communication between the compartments.

3. A leacher bucket provided with a foraminous bottom, a removable partition within and resting on the bottom of the bucket and dividing the lower part of the latter into a plurality of ground-coffee compartments, the partition having notches in its upper edge, and a cover for the bucket provided with means for discharging jets of boiling water into the compartments.

4. A leacher bucket provided with a foraminous bottom, a removable partition within and resting on the bottom of the bucket and dividing the lower part of the latter into a plurality of ground-coffee compartments, the partition having notches in its upper edge; a cover for the bucket, a perforated jet plate secured to and within the cover and provided with a hollow annular rib depending into notches of the partition, a tube secured in the cover and provided with a jet orifice for discharging into one of the compartments of the partition and with perforations to supply water to the upper side of the jet plate, and means for conducting boiling water to said tube.

5. A leacher bucket provided with a foraminous bottom, a paper filter resting on the bottom, a wheel-shaped partition resting on said filter and provided with a central chamber and surrounding chambers, and with notches establishing communication between all of the chambers in a plane above the bottom thereof, a perforated jet plate secured to the under side of the cover and provided with a hollow annular rib depending into certain notches of the partition, and a pipeway for supplying water to the interior of the cover above the jet plate and also provided with jet orifices for discharging into the central chamber of the partition.

In testimony whereof I affix my signature.

HENRY D. KELLY.